United States Patent [19]

Subbarao

[11] Patent Number: 5,148,209
[45] Date of Patent: Sep. 15, 1992

[54] PASSIVE RANGING AND RAPID AUTOFOCUSING

[75] Inventor: Muralidhara Subbarao, Setauket, N.Y.

[73] Assignee: The Research Foundation of State University of New York, Albany, N.Y.

[21] Appl. No.: 551,933

[22] Filed: Jul. 12, 1990

[51] Int. Cl.$^5$ ............................................. B03B 13/36
[52] U.S. Cl. .................................... 354/400; 358/227
[58] Field of Search ............... 354/400, 402, 406, 407, 354/408; 358/227

[56] References Cited

U.S. PATENT DOCUMENTS 4,814,889 3/1989 Covey ................................ 354/402
4,965,840 10/1990 Subbarao ............................... 382/1

FOREIGN PATENT DOCUMENTS 62-284314 12/1987 Japan .
63-127217 5/1988 Japan .

OTHER PUBLICATIONS

On the Depth Information in the PSF of a Camera System, by M. Subbarao, Tech. Rep. 90.02.07, Dept of EE, Suny, StonyBrook.
Determining Distance From Defocused Images of Simple Objects by M. Subbarao, Tech. Rep. 89.07.20, Dept. of EE, Suny, StonyBrook.

Primary Examiner—Russell E. Adams
Attorney, Agent, or Firm—Hoffmann & Baron

[57] ABSTRACT

Apparatus and methods based on signal processing techniques are disclosed for determining the distance of an object from a camera, rapid autofocusing of a camera, and obtaining focused pictures from blurred pictures produced by a camera. The apparatus of the present invention includes a camera characterized by a set of four camera parameters: position of the image detector or film inside the camera, focal length of the optical system in the camera, the size of the aperture of the camera, and the characteristics of the light filter in the camera. In the method of the present invention, at least two images of the object are recorded with different values for the set of camera parameters. The two images are converted to a standard format to obtain two normalized images. The values of the camera parameters and the normalized images are substituted into an equation obtained by equating two expressions for the focused image of the object. The two expressions for the focused image are based on a new deconvolution formula which requires computing only the derivatives of the normalized images and a set of weight parameters dependent on the camera parameters and the point spread function of the camera. In particular, the deconvolution formula does not involve any Fourier transforms and therefore the present invention has significant advantages over prior art. The equation which results from equating two expressions for the focused image of the object is solved to obtain a set of solutions for the distance of the object. A third image of the object is then recorded with new values for the set of camera parameters. The solution for distance which is consistent with the third image and the new values for the camera parameters is determined to obtain the distance of the object. Based on the distance of the object, a set of values is determined for the camera parameters for focusing the object. The camera parameters are then set equal to these values to accomplish autofocusing. After determining the distance of the object, the focused image of the object is obtained using the deconvolution formula. A generalized version of the method of determining the distance of an object can be used to determine one or more unknown camera parameters. This generalized version is also applicable to any linear shift-invariant system for system parameter estimation and signal restoration.

20 Claims, 9 Drawing Sheets

L1, L2: LENSES
LF: LIGHT FILTER
OA: OPTICAL AXIS
ID: IMAGE DETECTOR

As: APERTURE STOP
P1, P2: PRINCIPAL PLANES
OS: OPTICAL SYSTEM

PASSIVE RANGING AND RAPID AUTOFOCUSING

FIELD OF INVENTION

The present invention relates to an apparatus and a method based on signal processing techniques for passive ranging of objects by a camera, i.e. determining the distance of objects from the camera without employing active methods such as sending out infrared, sonar, laser or other type of beams towards the objects, but using only ambient illumination. The present invention also relates to passive methods for rapid autofocusing of a camera, and obtaining improved focus images from blurred images produced by a camera. In general, this invention relates to system parameter estimation and signal restoration in any linear shift-invariant system, i.e. a system that performs convolution operation on the input signal.

PRIOR ART

Finding the distance of objects from a camera system has applications in the fields of robotic vision, machine vision, autonomous vehicle navigation, and rapid autofocusing of camera systems. Many methods and apparatus are known for determining the distance of objects from a camera system. A review of the methods relevant to the present invention can be found in the following two patent applications filed by this same inventor: (i) U.S. patent application Ser. No. 126407, pending, filed on Nov. 27, 1987, and (ii) U.S. patent application Ser. No. 07/373996, pending, filed on Jun. 29, 1989.

In all of known prior art (e.g. U.S. patent application Ser. No. 126407 (Nov. 27, 1987) and Ser. No. 07/373996 (Jun. 24, 1989) filed by this inventor, Japanese patent no. 62-284314 granted to FUJI in 1987, and Japanese patent no. 63-127217 (laid open date May 31, 1988) awarded to CANNON) there are many common important drawbacks. In the relevant prior art, the methods of determining distance are all based on computing the Fourier transforms of two or more recorded images and then computing the ratio of these two Fourier transforms. Computing the two-dimensional Fourier transforms of recorded images is computationally very expensive. It involves complex and expensive hardware.

Another drawback of the methods of prior art is that they cannot be used to determine the distance of small objects. They can be used to determine the distance of only large objects. This is because the reliable computation of Fourier coefficients of the image of an object requires that the image of the object be large.

Determining the distance of an object is an essential step in any method of autofocusing, and also in any method of obtaining focused images from blurred images of the object. Therefore, the drawbacks mentioned above are also applicable to prior art on autofocusing and methods for obtaining improved focus images from blurred images.

SUMMARY OF THE INVENTION

An object of the present invention is a method of finding the distance of an object from a camera system by recording and processing at least two pictures of the object. More than two pictures may be used to avoid ambiguity and to increase robustness.

Another object of the present invention is a method for rapid autofocusing of cameras by acquiring and processing three or more images.

An additional object of the present invention is a method for obtaining improved focus images from blurred images.

A further object of the present invention is a method for estimating system parameters and recovering input signal in any instrument that can be modeled as a linear shift-invariant system, i.e. a system that performs convolution operation.

The apparatus of the present invention comprises a camera system including (i) an optical system for forming images, (ii) an image detector for recording images, (iii) a camera aperture through which light enters the camera, and (iv) a light filter to control the spectral content of light entering the camera system. The optical system is characterized by a first principal plane and a second principal plane. The second principal plane is closer to the image detector than the first principal plane.

The camera system is characterized by a set of camera parameters which include:
(i) the distance between the second principal plane and the image detector,
(ii) the diameter of the camera aperture,
(iii) the focal length of the optical system, and
(iv) the spectral transmittance characteristic of the light filter.

The apparatus also includes a camera controller for setting the values of the camera parameters to desired values, and an image normalization means. The image normalization means is used to convert different images of an object, each image recorded with different settings of camera parameter values, to a standard format. The standard format is such that an image of an object represented in this format can be expressed as the result of convolving a standard focused image of the object with the point spread function of the camera. An image represented in the standard format is also referred to as a normalized image.

The apparatus further includes a derivative computation means for computing derivatives of normalized images, an equation solving means, and a set intersection means. The equation solving means can substitute into an equation the values of different derivatives of normalized images and camera parameter values, and solve the resulting equation to obtain a set of solutions for the distance of the object from the camera. The set intersection means is used to take two sets of solutions for the distance of the object from the camera and intersect the two sets to find the common solution to the distance of the object.

In the apparatus for rapid autofocusing, a focus parameter determination means is included in addition to the apparatus for determining the distance of the object. The focus parameter determination means is used to determine values for the camera parameters based on the distance of the object to be focused so that the object is focused when the camera parameters are set to the values thus determined.

The method of determining the distance of an object from a camera includes the steps below.

The camera parameters of the camera are set to a first set of camera parameter values by the camera controller. Then a first image of the object is recorded. The camera parameters are then set to a second set of camera parameter values by the camera controller, and a second image of the object is recorded.

The first image is preprocessed to obtain a first normalized image. The first normalized image is such that it is equal to the convolution of a focused image of the object with a first point spread function of the camera characterized by the first set of camera parameter values. The second image is preprocessed in a manner similar to the first image to obtain a second normalized image.

A set of derivatives of the first normalized image is computed to obtain a first set of image derivatives. Similarly, a set of derivatives of the second normalized image is computed to obtain a second set of image derivatives.

The values of the first set of camera parameter values, the second set of camera parameter values, the first set of image derivatives, and the second set of image derivatives are all substituted into a predetermined equation. This equation is predetermined by equating a first expression to a second expression where the first expression gives the focused image of the object in terms of the first set of the camera parameter values and the first set of image derivatives, and the second expression also gives the focused image of the object but in terms of the second set of camera parameter values and the second set of image derivatives. After the substitution into the predetermined equation, the resulting equation contains only one unknown which is the distance of the object from the camera. This equation is then solved to obtain a first set of solutions for the distance. This set typically contains two members. In obtaining the first set of solutions for distance, no Fourier transforms are computed. In comparison, prior art involves the computation of Fourier transforms which is a complex and expensive operation. Thus the method of present invention has a great advantage over prior art.

Next the camera parameters are set to a third set of camera parameter values by the camera controller and a third image is formed inside the camera. This third image is recorded. Then the member of the first set of solutions which is consistent with the third image and the third set of camera parameter values is determined to obtain the distance of the object from the camera. The consistency check can be performed in many ways. For example, the second and the third images can be used to obtain a second set of solutions for the distance, and then the first set of solutions and the second set of solutions can be intersected to obtain a common solution which gives the distance of the object.

In the method of rapid autofocusing, first the distance of the object to be focused is determined according to the above method. Then, based on the distance of the object and an image focusing formula, a new set of camera parameter values is determined. The camera parameters are set by the camera controller to the new set of camera parameter values, thereby autofocusing the object.

The method of determining an improved-focus image of an object from its blurred images recorded with different camera settings can be summarized as follows. First the distance of the object is determined by using the method outlined earlier. Based on this distance, the moment parameters of the point spread function corresponding to one of the recorded image of the object is determined. This image and its derivatives are then substituted into a deconvolution formula to obtain an improved focus image of the object.

ADVANTAGES

An important advantage of the present invention is that it does not involve the computation of Fourier transforms whereas prior art does involve the computation of Fourier transforms. Computation of Fourier transforms is computationally very expensive. This operation is slow and requires expensive hardware. Therefore, the apparatus of the present invention is cheaper, simpler, and faster than the apparatus of prior art.

Another important advantage of the present invention is that it can be used to determine the distance of very small objects. This capability is lacking in prior art. In the present invention, the determination of distance of small objects is possible because the computations are based on the derivatives of images. The derivatives of the image of an object can be computed even when the image of the object is relatively small. The lack of this capability in prior art is due to the fact that the methods of prior art are based on the computation of Fourier transforms. The reliable computation of the Fourier transform of the image of an object requires the object to be relatively large.

The present invention shares many important features of an earlier invention by this same inventor (U.S. patent application Ser. No. 07/373996, filed on Jun. 29, 1989, pending). For example, the present invention is not restricted by the form of the point spread function of the camera. It is applicable to any camera system that can be modeled as a linear shift-invariant system (i.e. a system that performs convolution). Therefore it is applicable even in the presence of significant optical aberrations and image distortion caused by diffraction. In particular, the present invention is applicable but not restricted to Gaussian and cylindrical shaped point spread functions. In the present invention, the point spread function is characterized completely in terms of the relevant camera parameters, thus accounting for diffraction effects and lens aberrations.

The present invention is also general and therefore many camera parameters can be changed simultaneously instead of changing only one camera parameter at a time. Further, it generalizes the method of determining distance to determining other camera parameters. It also generalizes the method to any linear shift-invariant system for estimating any number of system parameters and estimating the input signal.

Further advantages of the present invention will become apparent hereinafter to those with ordinary skill in the art to which the present invention pertains.

BRIEF DESCRIPTION OF THE DRAWINGS

For a further understanding of the objects of the present invention, reference is made to the following description of the preferred embodiment which is to be taken in connection with the accompanying drawings.

FIG. 4b is a continuation of FIG. 4a. This diagram illustrates the method of obtaining a unique solution for the distance of an object by intersecting two sets of solutions, and also the methods for rapid autofocusing and obtaining the focused image of an object from its blurred image.

DETAILED DESCRIPTION OF THE PREFERRED EMBODIMENTS

Figure 1:
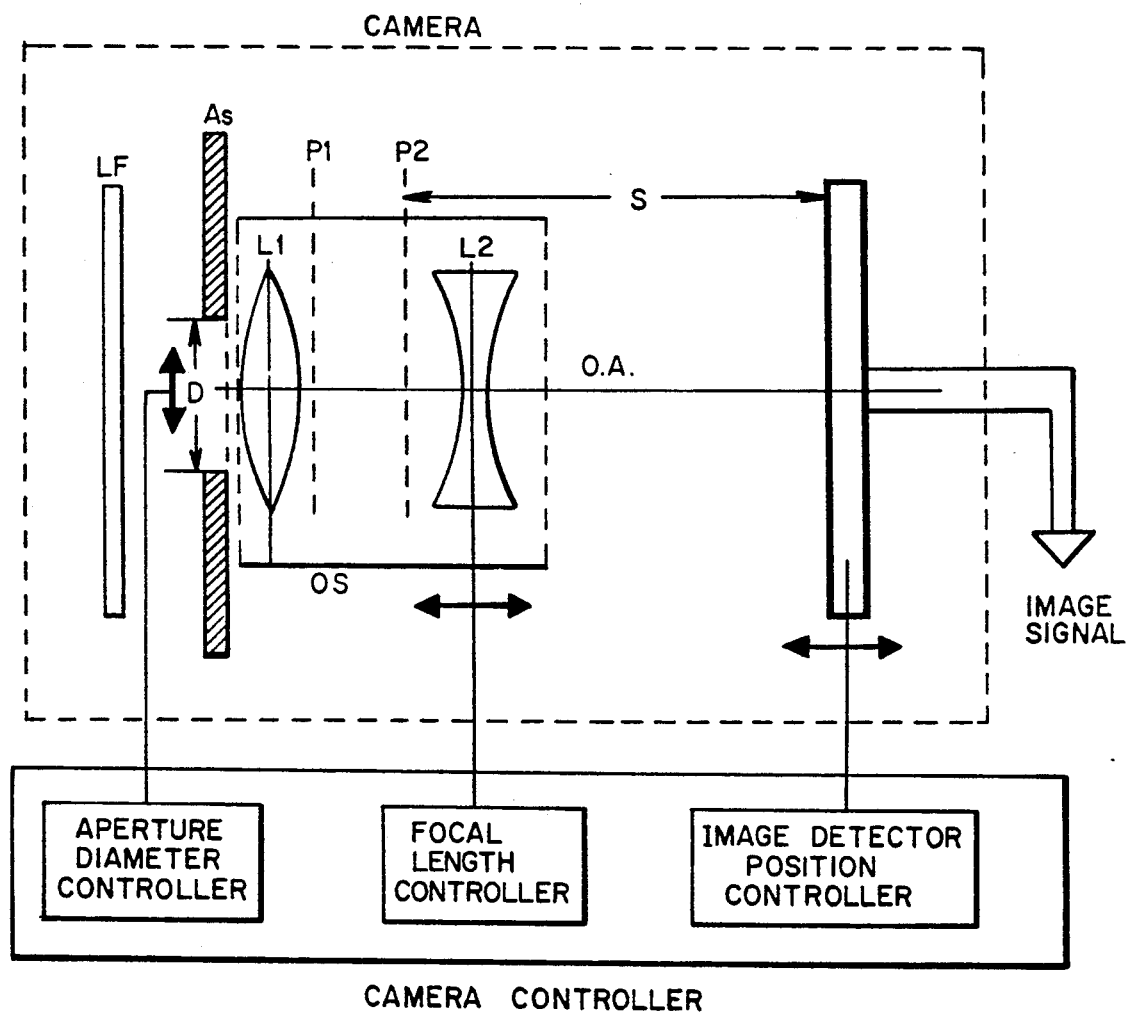
FIG. 1 is a block diagram of the camera system of the preferred embodiment. It illustrates a focal length controller, image detector position controller, a camera aperture diameter controller, and a filter to control the spectral content of light entering the camera.

FIG. 1 shows the camera system of the preferred embodiment. It includes a light filter LF, an aperture stop AS, an optical system OS, and an image detector ID. The light filter LF controls the spectral content of light entering the camera. For example, a red filter transmits only red light and blocks light of all other wavelengths. The amount of light entering the camera is controlled by the aperture stop AS. In the preferred embodiment, the aperture of the aperture stop is circular. Therefore, the amount of light is controlled by varying the diameter of the aperture of the aperture stop. The aperture of the aperture stop is also referred to as the camera aperture. In the preferred embodiment, the optical system OS consists of lenses. The optical system OS forms an image of the scene on the image detector ID. The image formed on the image detector ID is converted to an electronic video signal which forms the output of the camera system.

Figure 2:
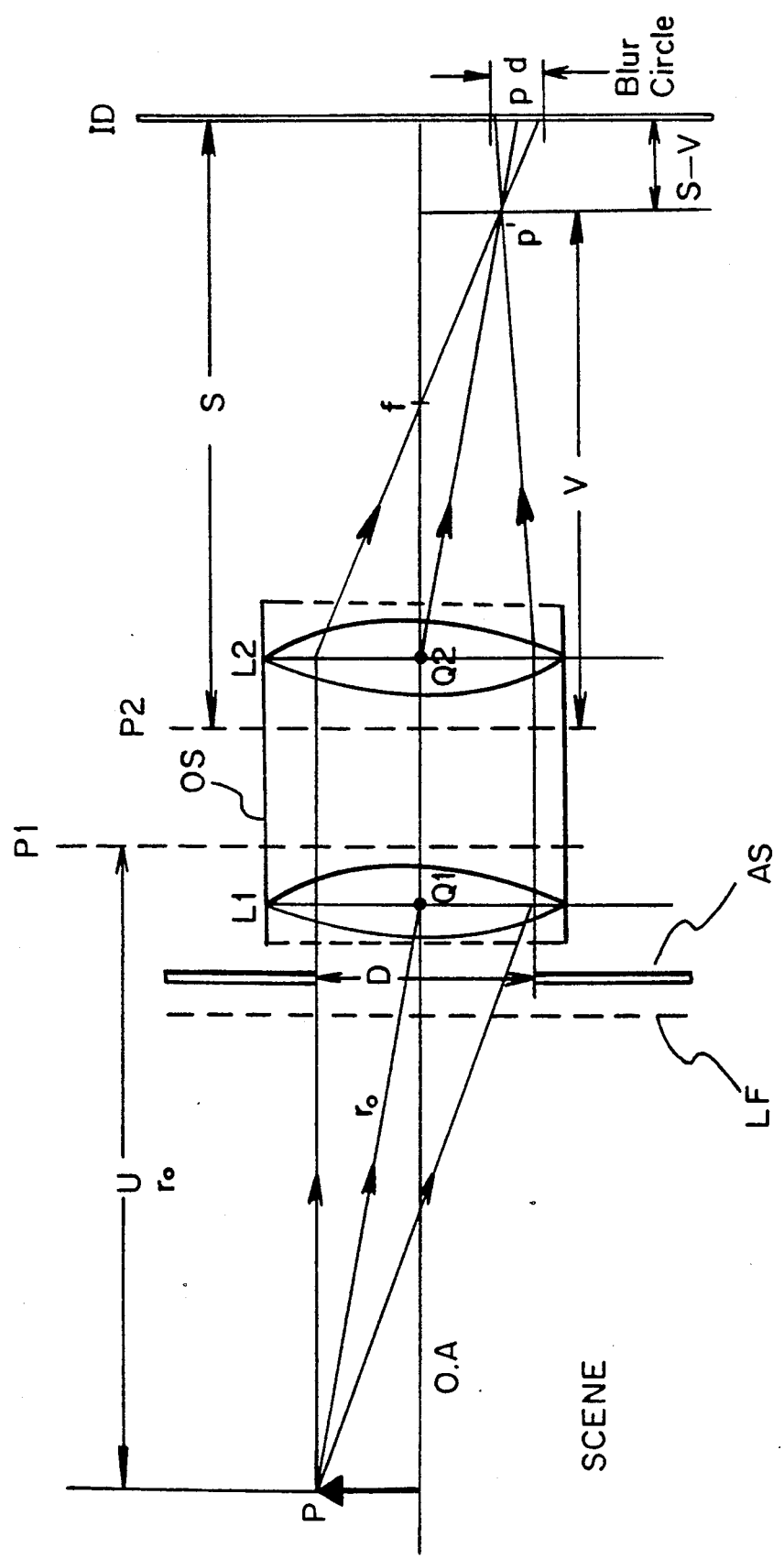
FIG. 2 illustrates the camera parameters and the image formation process in the preferred embodiment of the camera system.

The camera is characterized by a set of camera parameters. The camera parameters are (see FIG. 2): (i) the distance s between the second principal plane P2 of the optical system and the image detector ID, (ii) the diameter D of the camera aperture, (iii) the focal length f of the optical system, and (iv) the spectral transmittance characteristic $\lambda$ of the light filter LF. The values of the camera parameters s, f, and D, are respectively controlled by three controllers: image detector position controller, focal length controller, and aperture controller. These controllers can be used to set the values of the camera parameters s, f, and D to desired values. The three controllers together constitute the camera controller.

Figure 3:
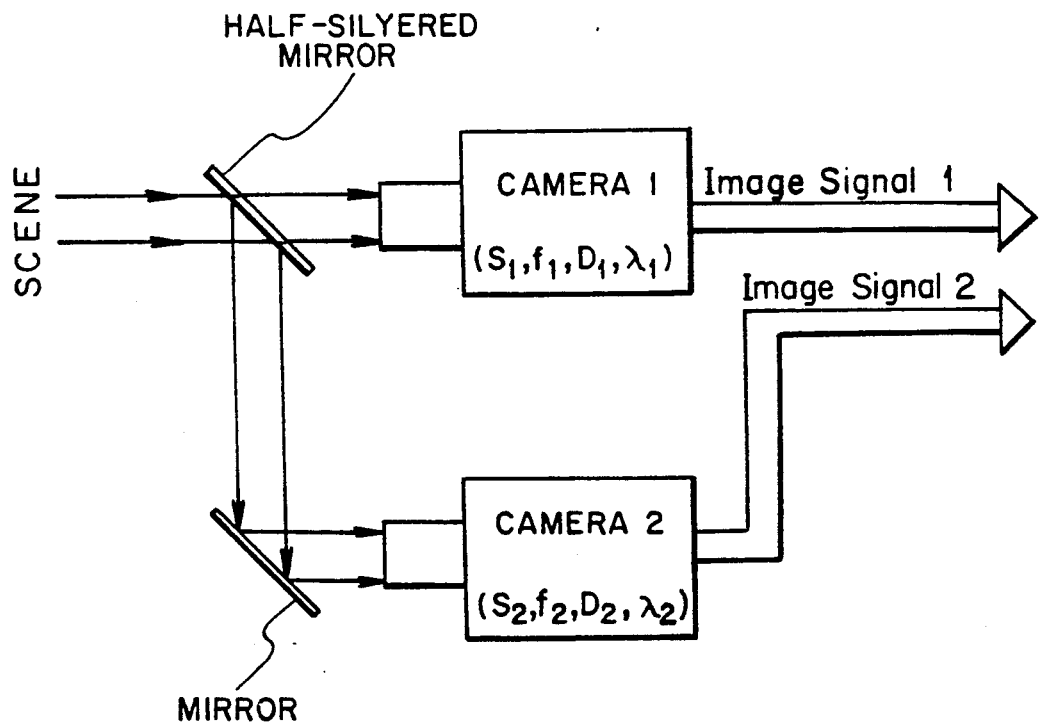
FIG. 3 is a block diagram of an alternative camera embodiment having two cameras (instead of one camera) with different camera parameter values and a beam-splitting arrangement for viewing a scene through a common aperture.

An alternative embodiment of the camera system is obtained by a minor modification of the preferred embodiment described above. In this modified embodiment, instead of using a single camera system which provides means for changing the camera parameters, multiple cameras are used. These multiple cameras are such that the camera parameter values of each individual camera differs in at least one of the camera parameters in comparison with all other cameras. That is, no two cameras among the multiple cameras have identical camera parameter values for all camera parameters. In this apparatus, there is no necessity to provide for varying any of the camera parameters of the individual cameras. All camera parameters of each camera can be fixed, thus avoiding the necessity for any moving parts in the camera system. Therefore the apparatus can be made rugged. Each camera is used in acquiring one image corresponding to one set of values of camera parameters. Each of the individual cameras view the scene through a common aperture with the aid of a beam-splitting arrangement. Except for the above differences, the alternative embodiment is similar to the preferred embodiment. FIG. 3 shows an example where two cameras with different camera parameters values view the scene through a beam-splitter consisting of a half-silvered mirror and a full mirror.

Figure 4A:
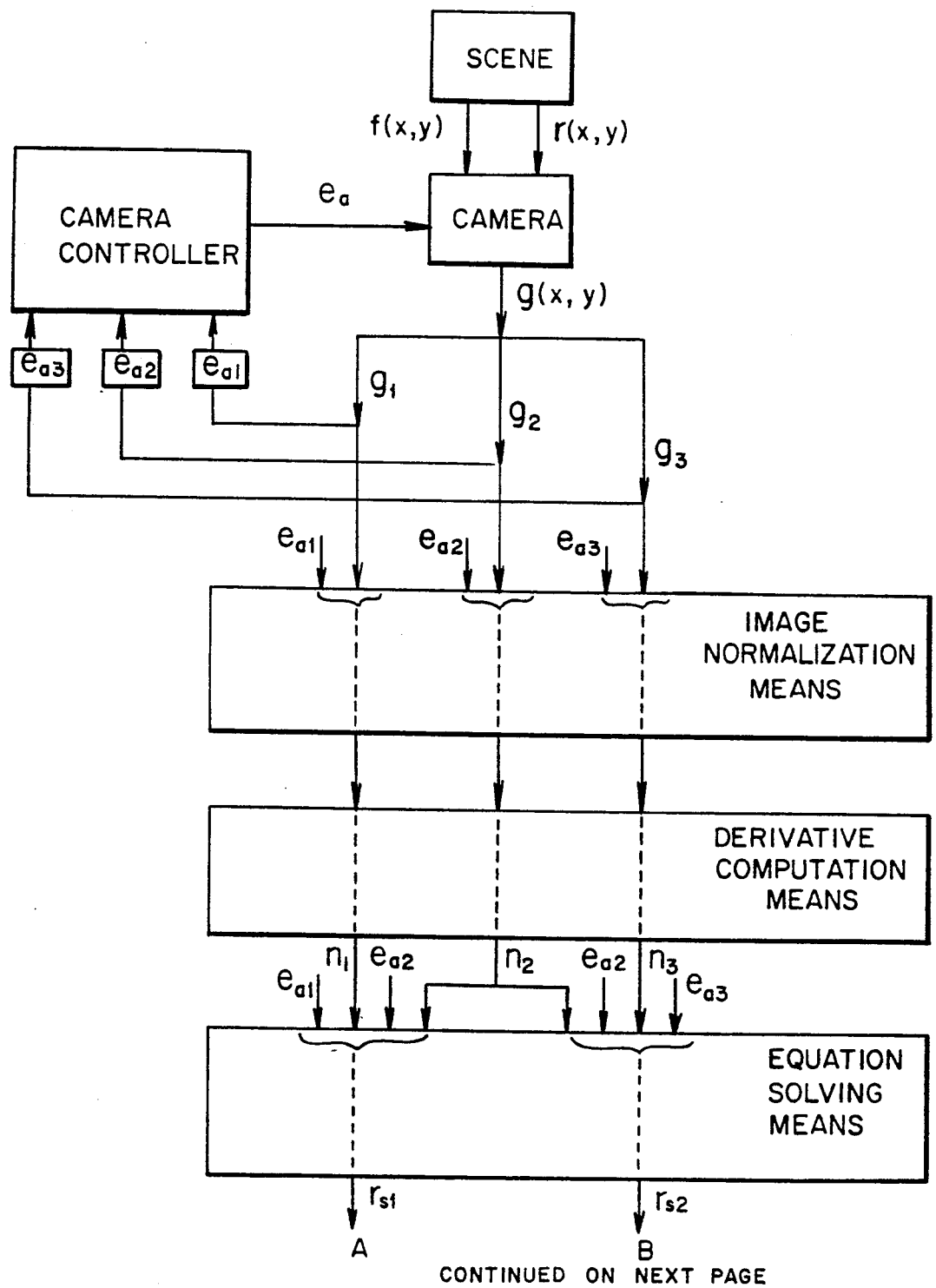
FIG. 4a is a schematic drawing showing the apparatus of the present invention for finding the distance of an object from a camera.
Figure 4B:
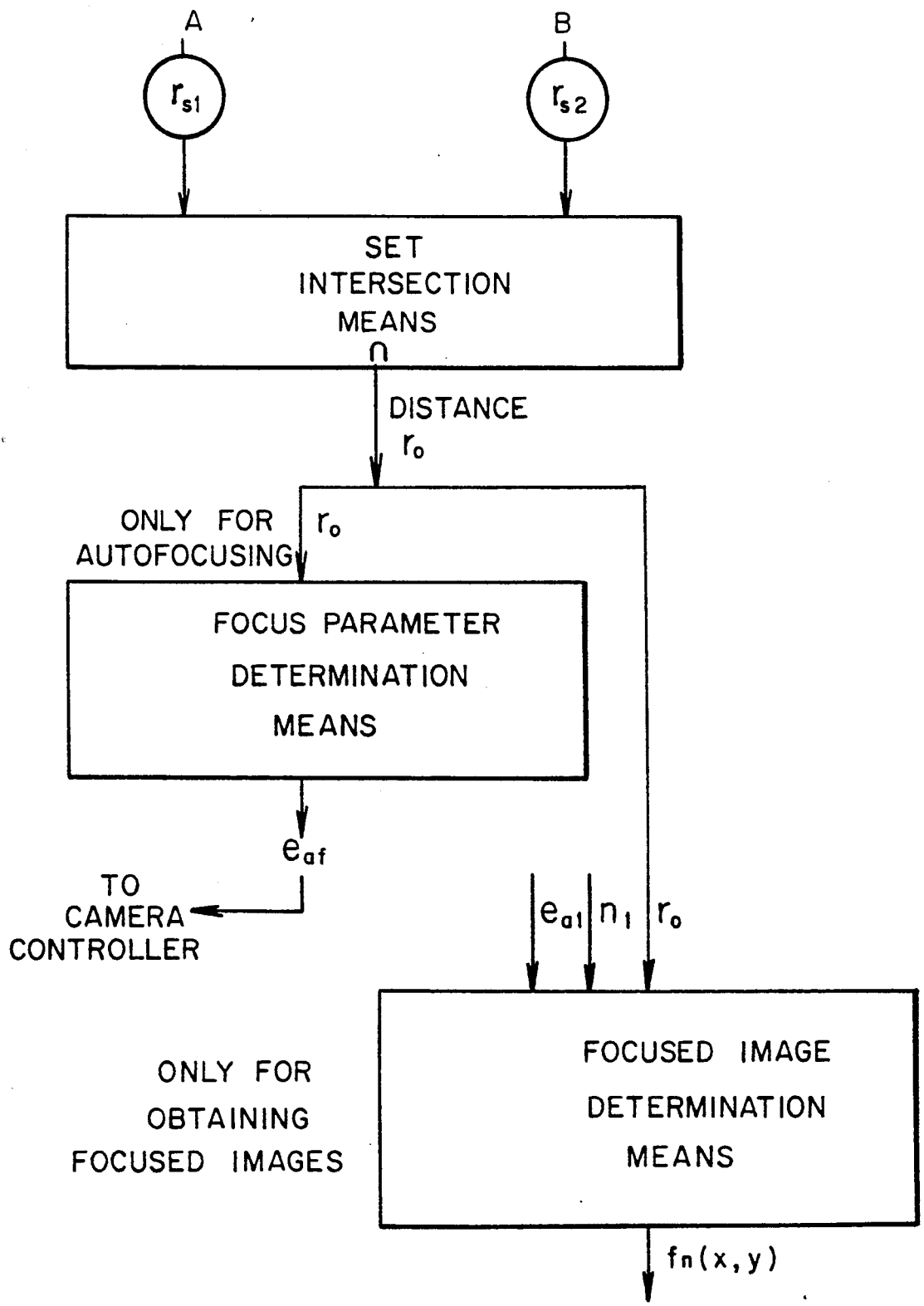
FIG. 4b is a continuation of this figure.

FIG. 4a and FIG. 4b show the apparatus of the preferred embodiment of the present invention. In these figures, the input from the scene to the camera are the focused image f(x, y) of the scene, and the geometry r(x, y) of the scene. The focused image f(x, y) specifies the amount of light received from a particular direction of the scene specified by (x, y). The geometry r(x, y) specifies the distance of the object from the camera along the direction specified by (x, y). The values of the set of camera parameters $\{\lambda, s, f, D\}$ are set by the camera controller. The output of the camera is a recorded image g(x, y). In FIG. 4a, the output of the camera corresponding to three different values $e_{a1} = \{\lambda_1, s_1, f_1, D_1\}$, $e_{a2} = \{\lambda_2, s_2, f_2, D_2\}$, and $e_{a3} = \{\lambda_3, s_3, f_3, D_3\}$ of the set of camera parameters $\{\lambda, s, f, D\}$ are denoted by $g_1(x, y)$, $g_2(x, y)$, and $g_3(x, y)$ respectively.

The apparatus also includes an image normalization means. The image normalization means is used to convert different images recorded with different values for the set of camera parameters $\{\lambda, s, f, D\}$ to a standard format. This conversion process is called image normalization.

The image normalization is such that the image of an object after normalization can be expressed as the result of convolving a standard focused image of the object with the point spread function of the camera characterized by the corresponding camera parameter values. For example, in FIG. 4a, the images $g_1(x, y)$, $g_2(x, y)$ and $g_3(x, y)$ are recorded with different values $e_{a1}$, $e_{a2}$ and $e_{a3}$ for the set of camera parameters $\{\lambda, s, f, D\}$.

The point spread function of the camera is denoted by $h(x, y; e_a, r_o)$ where (x, y) denotes a position on the image of an object, $e_a = \{\lambda, s, f, D\}$ denotes the values of the set of camera parameters, and $r_o$ denotes the distance of the object along the direction specified by (x, y). A standard or normalized focused image $f_n(x, y)$ corresponding to a focused image f(x, y) can be defined as $$f_n(x,y) = \frac{1}{E} f(x,y) \text{ where} \tag{1}$$

$$E = \int_{-\infty}^{\infty} \int_{-\infty}^{\infty} f(x,y) dx dy. \tag{2}$$

Intuitively, $f_n(x, y)$ specifies the fraction of the total light incident on the camera aperture from the direction specified by (x, y).

The three images $g_1(x, y)$, $g_2(x, y)$ and $g_3(x, y)$ after normalization are denoted by $g_{n1}(x, y)$, $g_{n2}(x, y)$ and $g_{n3}(x, y)$ respectively. Therefore, according to the definition of the image normalization operation, $$g_{n1}(x,y) = h(x,y;e_{a1}, r_0) * f_n(x,y) \qquad (3)$$

$$g_{n2}(x,y) = h(x,y;e_{a2}, r_0) * f_n(x,y) \qquad (4)$$

$$g_{n3}(x,y) = h(x,y;e_{a3}, r_0) * f_n(x,y) \qquad (5)$$

where * denotes the convolution operation. The convolution operation can be defined in expanded form using equation (3) as an example as below:

$$g_{n1}(x,y) = \int_{-\infty}^{\infty} \int_{-\infty}^{\infty} h(x-\xi, y-\eta; e_{a1}, r_0) f(\xi,\eta) d\xi d\eta. \qquad (6)$$

The apparatus also includes a derivative computation means for computing various derivatives of normalized images. For example, some of the derivatives of $g_{n1}(x, y)$ are $$g_{n1}(x,y), \frac{\partial^2}{\partial x^2} g_{n1}(x,y), \text{ and } \frac{\partial^2}{\partial y^2} g_{n1}(x,y). \qquad (7)$$

The apparatus further includes an equation solving means which can solve an equation of the form $$\sum_{k=0}^{N} \sum_{i=0}^{k} w_{1,i,k-i}(h,e_{a1},r_0) g_{n1}^{i,k-i} = \sum_{k=0}^{N} \sum_{i=0}^{k} w_{2,i,k-i}(h,e_{a2},r_0) g_{n2}^{i,k-i} \qquad (8)$$

where $w_{1,i,k-i}(h, e_{a1}, r_0)$ and $w_{2,i,k-i}(h, e_{a2}, r_0)$ represent expressions for weight parameters and $$g_{n1}^{i,k-i} \text{ and } g_{n2}^{i,k-i}$$

are partial derivatives defined by $$g_{n1}^{i,k-i} = \frac{\partial^i}{\partial x^i} \frac{\partial^{k-i}}{\partial y^{k-i}} g_{n1}(x,y), \text{ and} \qquad (9)$$

$$g_{n2}^{i,k-i} = \frac{\partial^i}{\partial x^i} \frac{\partial^{k-i}}{\partial y^{k-i}} g_{n2}(x,y). \qquad (10)$$

In equation (8) all quantities except the distance of the object $r_0$ corresponding to the image point (x, y) are known. Therefore, solving this equation, a set of solutions is obtained for $r_0$. Typically the set of solutions for $r_0$ contains two elements.

The apparatus includes a set intersection means (see FIG. 4b) to intersect two sets and find the elements common to both the sets. For example, if $r_{s1} = \{r_{11}, r_{12}\}$ and $r_{s2} = \{r_{21}, r_{22}\}$ are two sets, and $r_{12} = r_{22}$, then the set intersection means can intersect $r_{s1}$ and $r_{s2}$ to give $\{r_{12}\}$, i.e.

$$r_{s1} \cap r_{s2} = \{r_{12}\} = \{r_{22}\}. \qquad (11)$$

The apparatus for rapid autofocusing (FIG. 4a and FIG. 4b) is similar to the apparatus for determining the distance of an object. The main difference is that the apparatus for rapid autofocusing has an additional component which is the focus parameter determination means shown in FIG. 4b. The focus parameter determination means takes as input the distance of the object to be focused and gives as output a set of values $\{\lambda_f, s_f, f_f, D_f\}$ for the set of camera parameters $\{\lambda, s, f, D\}$ for focusing the object. The camera parameters of the camera are set to $\{\lambda_f, s_f, f_f, D_f\}$ so that the object is focused inside the camera.

The apparatus for obtaining the focused image of an object from its blurred image (FIG. 4a and FIG. 4b) is also similar to the apparatus for determining the distance of an object. The only difference is that the apparatus for obtaining the focused image has an additional component called the focused image determination means. This component takes as input the various derivatives of the blurred image of the object, the camera parameter values, and the distance of the object, and substitutes these input quantities into a deconvolution formula to give as output the focused image of the object.

Figure 5:
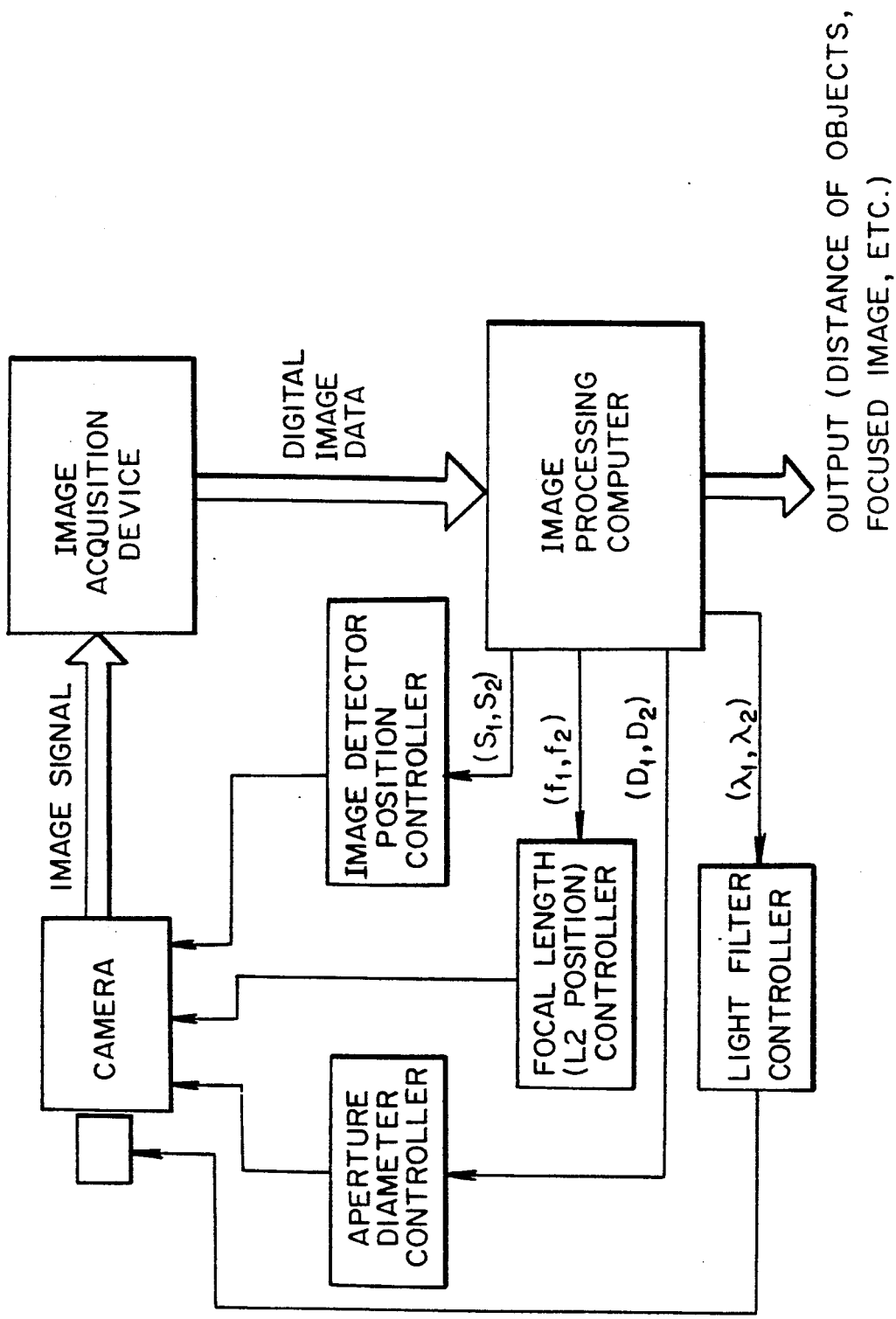
FIG. 5 shows an example where a digital image processing computer has been used in the implementation of the apparatus of the present invention.

Each component of the apparatus of the present invention can be implemented as a special purpose hardware using analog and digital electronic circuitry. In particular, a digital computer such as a microprocessor can be used to implement the image normalization means, the derivative computation means, the equation solving means, and the set intersection means. The focus parameter determination means and the focused image determination means can also be implemented using a digital computer. FIG. 5 shows an example where a digital image processing computer has been used to implement the apparatus of the present invention.

Having described the apparatus of the present invention, the method of the present invention will be described next. FIG. 4a and FIG. 4b are also helpful in understanding the method of the present invention.

In order to determine the distance of an object from a camera, the set of camera parameters $e_a = \{\lambda, s, f, D\}$ is set to a first set of camera parameter values $e_{a1} = \{\lambda_1, s_1, f_1, D_1\}$ by the camera controller, i.e., the camera controller sets the camera setting so that $\lambda = \lambda_1$, $s = s_1$, $f = f_1$, and $D = D_1$. Then a first image $g_1(x, y)$ of the object is formed inside the camera and the image is recorded. The set of camera parameters $e_a$ is then changed and set to a second set of camera parameter values $e_{a2} = \{\lambda_2, s_2, f_2, D_2\}$ by the camera controller, i.e., the camera controller changes the camera setting so that $\lambda = \lambda_2$, $s = s_2$, $f = f_2$, $D = D_2$. The second set of camera parameter values $e_{a2}$ is such that it is different from the first set of camera parameter values in at least one element i. e. $e_{a1} \neq e_{a2}$, i.e. ($\lambda_1 \neq \lambda_2$) or ($s_1 \neq s_2$) or ($f_1 \neq f_2$) or ($D_1 \neq D_2$). Then a second image $g_2(x, y)$ of the object is formed inside the camera and the image is recorded.

The first image $g_1(x, y)$ is preprocessed to obtain a first normalized image $g_{n1}(x, y)$. The first normalized image is such that it is equal to the convolution of a standard focused image $f_n(x, y)$ of the object with a first point spread function $h_1(x,y;e_{a1}, r_0)$ characterized by the first set of camera parameter values $e_{a1}$ (and the distance $r_0$ of the object). That is $$g_{n1}(x,y) = h(x,y;e_{a1}, r_0) * f_n(x,y). \qquad (12)$$

Conversion of the first image $g_1(x, y)$ to the first normalized image $g_{n1}(x, y)$ is accomplished using the image normalization means. This conversion process is called image normalization. The image normalization process can include many operations such as correcting for the response of sensor elements in the image detector of the camera, correcting for non-uniform light transmission of the camera, correcting for changes in magnification, and correcting for changes in brightness. These operations are known in prior art and hence will not be elaborated here. For example, a detailed description of the image normalization operations can be found in a copending patent application filed by this same inventor (U.S. patent application Ser. No. 07/373996, Jun. 29, 1989).

The second image $g_2(x, y)$ is also preprocessed in a manner similar to that of the first image $g_1(x, y)$ to obtain a second normalized image $g_{n2}(x, y)$. Therefore, the second normalized image $g_{n2}(x, y)$ is such that it is equal to the convolution of the standard focused image $f_n(x, y)$ with a second point spread function $h(x,y;e_{a2}, r_0)$ characterized by the second set of camera parameter values $e_{a2}$ (and the distance $r_0$ of the object). That is $$g_{n2}(x,y) = h(x,y;e_{a2}, r_0) * f_n(x,y). \tag{13}$$

Conversion of the second image $g_2(x, y)$ to the second normalized image $g_{n2}(x, y)$ is accomplished using the image normalization means.

A set of derivatives of the first normalized image $g_{n1}(x, y)$ is computed to obtain a first set of image derivatives $$\eta_1 = \{g_{n1}^{i,k-i} / i = 0,1,2,\ldots, k, \text{ and } k = 0,1,2,\ldots, N\} \tag{14}$$

where $$g_{n1}^{i,k-i}$$

is as defined in equation (9). For example, if $N=2$, then $$\eta_1 = \{g_{n1}^{0,0}, g_{n1}^{0,1}, g_{n1}^{1,0}, g_{n1}^{2,0}, g_{n1}^{1,1}, g_{n1}^{0,2}\}. \tag{15}$$

Similarly, a set of derivatives of the second normalized image $g_{n2}(x, y)$ is computed to obtain a second set of image derivatives $$\eta_2 = \{g_{n2}^{i,k-i} / i = 0,1,2,\ldots, k, \text{ and } k = 0,1,2,\ldots, N\} \tag{16}$$

where $$g_{n2}^{i,k-i}$$

is as defined in equation (10). For example, if $N=2$, then $$\eta_2 = \{g_{n2}^{0,0}, g_{n2}^{0,1}, g_{n2}^{1,0}, g_{n2}^{2,0}, g_{n2}^{1,1}, g_{n2}^{0,2}\}. \tag{17}$$

The computation of the first and second set of image derivatives $\eta_1$ and $\eta_2$ is accomplished using the derivative computation means.

The values of the first set of camera parameter values $e_{a1}$, the second set of camera parameter values $e_{a2}$, the first set of image derivatives $\eta_1$, and the second set of image derivatives $\eta_2$, are all substituted into equation (8) (see FIG. 4a).

The nature of equation (8) will be described now. Define $$\xi_1 = \{w_{1,i,k-i}/i=0,1,2,\ldots k, \text{ for } k=0,1,2,\ldots N\} \tag{18}$$

as a first set of weight parameters corresponding to the first set of image derivatives $\eta_1$, and define $$\xi_2 = \{w_{2,i,k-i}/i=0,1,2,\ldots k, \text{ for } k=0,1,2,\ldots N\} \tag{19}$$

as the second set of weight parameters corresponding to the second set of image derivatives $\eta_2$. For example, if $N=2$, then $$\xi_1 = \{w_{1,0,0}, w_{1,1,0}, w_{1,0,1}, w_{1,2,0}, w_{1,1,1}, w_{1,0,2}\} \tag{20}$$

and $$\xi_2 = \{w_{2,0,0}, w_{2,1,0}, w_{2,0,1}, w_{2,2,0}, w_{2,1,1}, w_{2,0,2}\}. \tag{21}$$

For each weight parameter $w_{j,i,k-i}$ there is a corresponding image derivative $$g_{nj}^{i,k-i}.$$

For example, the weight parameters $w_{1,0,0,0}$, $w_{1,0,2}$, and $w_{1,2,0}$, respectively correspond to the image derivatives $$g_{n1}^{0,0}, g_{n1}^{0,1}, g_{n1}^{0,2}, g_{n1}^{2,0}.$$

Similarly, the weight parameters $w_{2,0,0}$, $w_{2,0,1}$, $w_{2,0,2}$, and $w_{2,2,0}$ respectively correspond to the image derivatives $$g_{n2}^{0,0}, g_{n2}^{0,1}, g_{n2}^{0,2}, g_{n2}^{2,0}.$$

Multiplying each member of the first set of image derivatives $\eta_1$ by its corresponding weight parameter, a first set of weighted image derivatives $$W_1 = \{w_{1,i,k-i}/i=0,1,2,\ldots k, \text{ for } k=0,1,2,\ldots N\} \tag{22}$$

can be obtained.

Similarly, multiplying each member of the second set of image derivatives $\eta_2$ by its corresponding weight parameter, a second set of weighted derivatives $$W_2 = \{w_{2,i,k-i}/i=0,1,2,\ldots k, \text{ for } k=0,1,2,\ldots N\} \tag{23}$$

can be obtained.

Summing, all elements of the first set of weighted derivatives $W_1$ gives a first expression which is equal to the left hand side of equation (8). Similarly, summing all elements of the second set of weighted derivatives $W_2$ gives a second expression which is equal to the right hand side of equation (8). Therefore, equation (8) can indeed be obtained by equating the first expression to the second expression. The weight parameters $w_{1,i,k-i}$ are defined such that the first expression is equal to the focused image of the object expressed in terms of the first set of camera parameter values $e_{a1}$ and the first set of image derivatives $\eta_1$. That is, the weight parameters $w_{1,i,k-i}$ are defined such that $$f_n(x,y) = \sum_{k=0}^{N} \sum_{i=0}^{k} w_{1,i,k-i} g_{n1}^{i,k-i}. \tag{24}$$

Similarly, the weight parameters $w_{2,i,k-i}$ are defined such that the second expression is equal to the focused image of the object expressed in terms of the second set of camera parameter values $e_{a2}$ and the second set of image derivatives $\eta_2$. That is, the weight parameters $w_{2,i,k-i}$ are defined such that $$f_n(x,y) = \sum_{k=0}^{N} \sum_{i=0}^{k} w_{2,i,k-i} g_{n2}^{i,k-i}. \quad (25)$$

Recalling from equation (12) that $g_{n1}(x, y)$ is equal to the convolution of the first point spread function $h(x,y;e_{a1}, r_0)$ with the focused image $f_n(x, y)$, it should be recognized that equation (24) is actually a deconvolution formula. The blurred image corresponding to $g_{n1}(x,y)$ is deconvolved to recover the focused image $f_n(x,y)$. A similar observation holds good for equations (13) and (25). This deconvolution formula is not known in prior art. This formula was first derived and is being disclosed in another U.S. patent application filed by this same inventor on Jul. 3, 1990, having the title "Method and apparatus for restoring convolution degraded images and signals". In this patent, a procedure is also described for defining the weight parameters $w_{1,i,k-i}$ and $w_{2,i,k-i}$.

Each of the weight parameter $w_{1,i,k-i}$ can be expressed in terms of a first set of moment parameters $M_1$ defined as $$M_1 = \{h_{1,i,k-i}/i=0,1,2,\ldots k, \text{ for } k=0,1,2,\ldots N\} \quad (26)$$

where $$h_{1,i,k-i} = \int_{-\infty}^{\infty} \int_{-\infty}^{\infty} x^i y^{k-i} h(x,y;e_{a1},r_0) dx dy. \quad (27)$$

The first set of moment parameters $M_1$ characterizes a first point spread function $h(x,y;e_{a1},r_0)$. The first point spread function is the point spread function of the camera when the camera parameters are set equal to the first set of camera parameter values, i.e. $e_a=e_{a1}$. Similarly each of the weight parameters $w_{2,i,k-i}$ can be expressed in terms of a second set of moment parameters $M_2$ defined as $$M_2 = \{h_{2,i,k-i}/i=0,1,2,\ldots k, \text{ for } k=0,1,2,\ldots N\} \quad (28)$$

where $$h_{2,i,k-i} = \int_{-\infty}^{\infty} \int_{-\infty}^{\infty} x^i y^{k-i} h(x,y;e_{a2},r_0) dx dy. \quad (29)$$

The second set of moment parameters $M_2$ characterizes a second point spread function $h(x,y;e_{a2},r_0)$. The second point spread function is the point spread function of the camera when the camera parameters are set equal to the second set of camera parameter values, i.e. $e_a=e_{a2}$.

A method of deriving algebraic expressions for the weight parameters $w_{1,i,k-i}$ in terms of the first set of moment parameters $M_1$ is described in earlier mentioned U.S. patent application filed by this inventor on Jul. 3, 1990. The same method can be used to derive algebraic expressions for the weight parameters $w_{2,i,k-i}$ in terms of the second set of moment parameters $M_2$. Therefore, the algebraic expression for a weight parameter $w_{1,i,k-i}$ can be denoted in short form as $w_{1,i,k-i}(M_1)$. Similarly, the algebraic expression for a weight parameter $w_{2,i,k-i}$ can be denoted in short form as $w_{2,i,k-i}(M_2)$. For example, taking $N=2$, the following algebraic expressions can be derived for $w_{1,i,k-i}$ and $w_{2,i,k-i}$:

$$w_{1,0,0} = \frac{1}{h_{1,0,0}}, \quad (30)$$

$$w_{2,0,0} = \frac{1}{h_{2,0,0}},$$

$$w_{1,0,1} = \frac{h_{1,0,1}}{h_{1,0,0}^2},$$

$$w_{2,0,1} = \frac{h_{2,0,1}}{h_{2,0,0}^2},$$

$$w_{1,1,0} = \frac{h_{1,1,0}}{h_{1,0,0}^2},$$

$$w_{2,1,0} = \frac{h_{2,1,0}}{h_{2,0,0}^2},$$

$$w_{1,0,2} = \frac{h_{1,0,1}^2}{h_{1,0,0}^3} - \frac{h_{1,0,2}}{2h_{1,0,0}^2},$$

$$w_{2,0,2} = \frac{h_{2,0,1}^2}{h_{2,0,0}^3} - \frac{h_{2,0,2}}{2h_{2,0,0}^2},$$

$$w_{1,1,1} = \frac{h_{1,0,1} h_{1,1,0}}{h_{1,0,0}^3} - \frac{h_{1,1,1}}{h_{1,0,0}^2},$$

$$w_{2,1,1} = \frac{h_{2,0,1} h_{2,1,0}}{h_{2,0,0}^3} - \frac{h_{2,1,1}}{h_{2,0,0}^2},$$

$$w_{1,2,0} = \frac{h_{1,1,0}^2}{h_{1,0,0}^3} - \frac{h_{1,2,0}}{2h_{1,0,0}^2},$$

$$w_{2,2,0} = \frac{h_{2,1,0}^2}{h_{2,0,0}^3} - \frac{h_{2,2,0}}{2h_{2,0,0}^2}.$$

However, according to equations (26), (27) the first set of moment parameters $M_1$ is itself determined by the form of the point spread function $h$, the first set of camera parameter values $e_{a1}$, and the distance $r_0$ of the object from the camera. Therefore, the algebraic expression $w_{1,i,k-i}(M_1)$ can be denoted by $w_{1,i,k-i}(h,e_{a1},r_0)$ to more explicitly convey the fact that the weight parameters $w_{1,i,k-i}$ can be expressed in terms of the point spread function $h$, the first set of camera parameter values $e_{a1}$, and the distance $r_0$ of the object from the camera. For a similar reason, the algebraic expression $w_{2,i,k-i}(M_2)$ can be denoted by $w_{2,i,k-i}(h,e_{a2},r_0)$.

In summary, equation (8) is formulated to obtain an equation which contains only one unknown which is the distance $r_0$ of the object from the camera. This equation is solved to obtain a first set of solutions $r_{s1}$. Typically $r_{s1}$ contains two elements and therefore can be represented as $$r_{s1} = \{r_{11}, r_{12}\}. \quad (31)$$

Note that, in contrast with prior art, the first set of solutions $r_{s1}$ has been obtained without computing any Fourier transform. This constitutes an important advantage of the present invention.

To obtain a unique solution for the distance of the object, additional information is needed. In the method of the present invention, additional information is obtained by setting the camera to a third set of camera parameter values $e_{a3} = \{\lambda_3, s_3, f_3, D_3\}$ such that $e_{a3} \neq e_{a1}$ and $e_{a3} \neq e_{a2}$ (i.e. at least one of the camera parameter is different), forming an image of the object inside the camera, and recording a third image $g_3(x,y)$. Among the members of the first set of solutions $r_{s1}$ only one member will be consistent with the third set of camera parameter values $e_{a3}$ and the third image $g_3(x,y)$. This member which is consistent with $e_{a3}$ and $g_3(x,y)$ is determined to obtain the distance of the object from the camera.

There are many methods of checking the consistency of a solution with $e_{a3}$ and $g_3(x,y)$. One method is to use the third image $g_3(x,y)$ and the second image $g_2(x,y)$ and determine a second set of solutions $r_{s2}$ for the distance of the object from the camera. The method of determining $r_{s2}$ using $g_3(x,y)$ and $g_2(x,y)$ is very similar to the method that has been described above for determining the first set of solutions $r_{s1}$ using the first image $g_1(x,y)$ and the second image $g_2(x,y)$. The second set of solutions $r_{s2}$ will typically contain two elements. One of the elements of $r_{s2}$ will also be an element of $r_{s1}$. This element is determined by taking the intersection of the sets $r_{s1}$ and $r_{s2}$. This common element gives a unique solution for the distance of the object from the camera. Thus the distance $r_0$ of an object from a camera can be determined.

In principle, acquiring and processing just three images of an object are sufficient to determine the distance of the object. However, a more robust estimate of the distance can be obtained by processing several distinct triplets of images of the object. Each distinct triplet of images is processed to obtain one independent estimate of distance. A weighted average of all the independent estimates of distances yields a robust estimate of distance. In general, the distance of the object estimated by the above described method can be combined with other independent distance estimates (obtained by either the same method or a different method) by taking a weighted average to obtain a more robust estimate of the distance.

Figure 6:
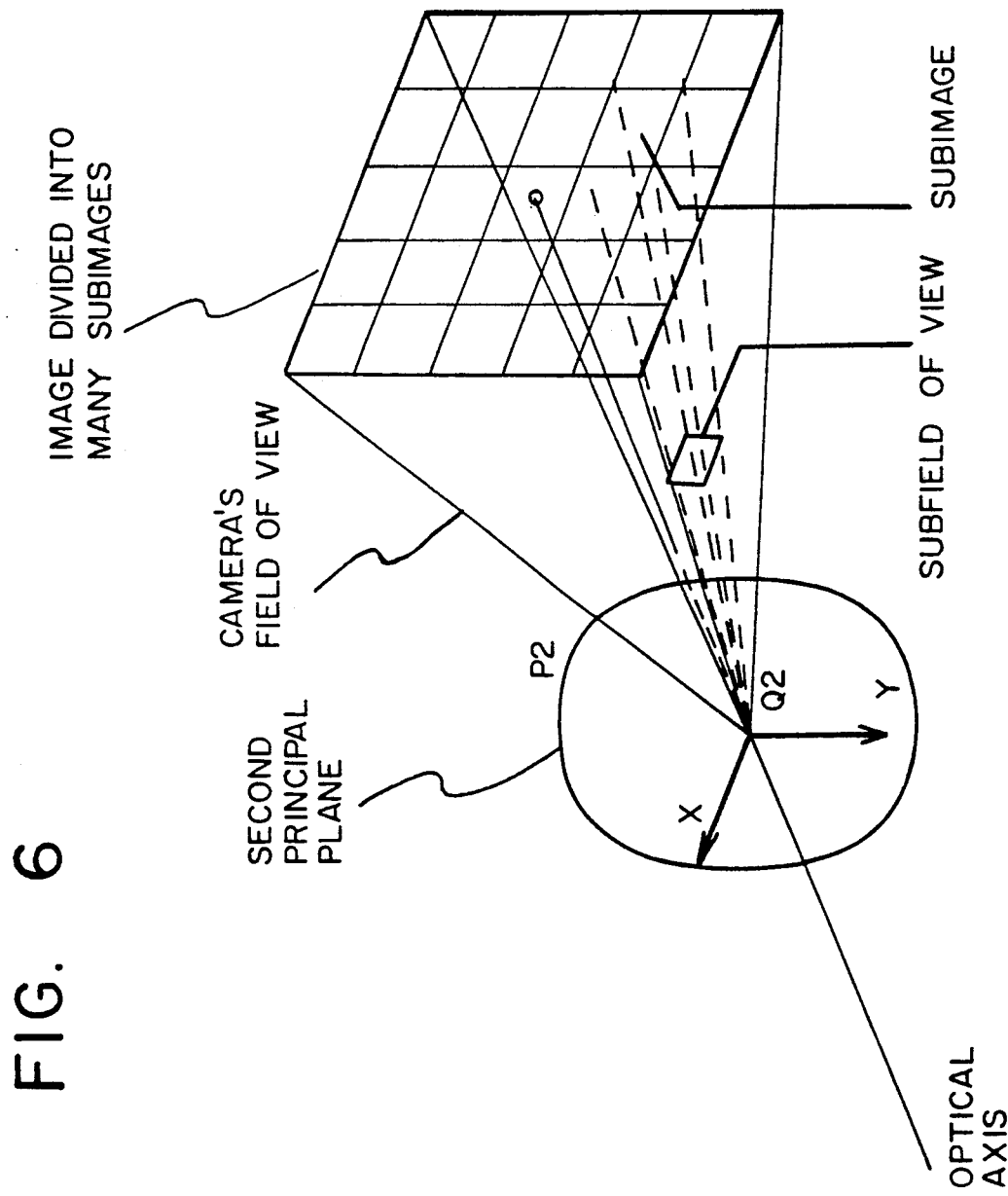
FIG. 6 shows the camera's field-of-view divided into many smaller subfield-of-views and the corresponding subimages into which the image has been divided.

The above method of determining the distance of an object from a camera can be applied to all objects in the field-of-view of the camera simultaneously to obtain the distance of all objects in the field-of-view. For example, the field-of-view of the camera can be divided into many smaller subfield-of-views and in each subfield-of-view the distance of the object in that subfield-of-view can be determined. Dividing the camera's field-of-view into many subfield-of-views corresponds to dividing the image formed on the image detector into many smaller subimages where each subimage corresponds to one subfield-of-view. FIG. 6 illustrates this concept. Each subimage can be processed in parallel with other subimages to determine the distance of the object in the corresponding subfield-of-view. Thus, the distance of all objects in the field-of-view of a camera can be determined simultaneously from only three images. This method has important applications in robotic vision where it is required to find the position of all objects in a scene very fast with minimal computation. An array of numbers representing the distance (or depth) of object points in a scene in small subfields-of-view of a camera is called the depth-map of the scene. Therefore, the method of the present invention is useful in obtaining the depth-map of a scene in an efficient manner.

The present invention also includes a method for rapid autofocusing of a camera (see FIG. 4a and FIG. 4b). In this method, first the distance of the object to be focused is determined by using the above method for determining the distance $r_0$ of an object from the camera. Based on distance $r_0$ and an image focusing formula, a set of camera parameter values $e_{af} = \{\lambda_f, s_f, F_f, D_f\}$ is determined which corresponds to focusing the desired object. An example of the image focusing formula is the well-known lens formula $1/f = 1/u + 1/v$ (see FIG. 2) which relates the focal length of the camera to the distance of the object and the distance of its focused image. The relation between this image focusing formula and the set of camera parameters $e_{af}$ is given by equation (58) which is explained later. The camera is then adjusted so that the camera parameters are equal to the values determined by $e_{af}$. This accomplishes autofocusing.

Figure 7:
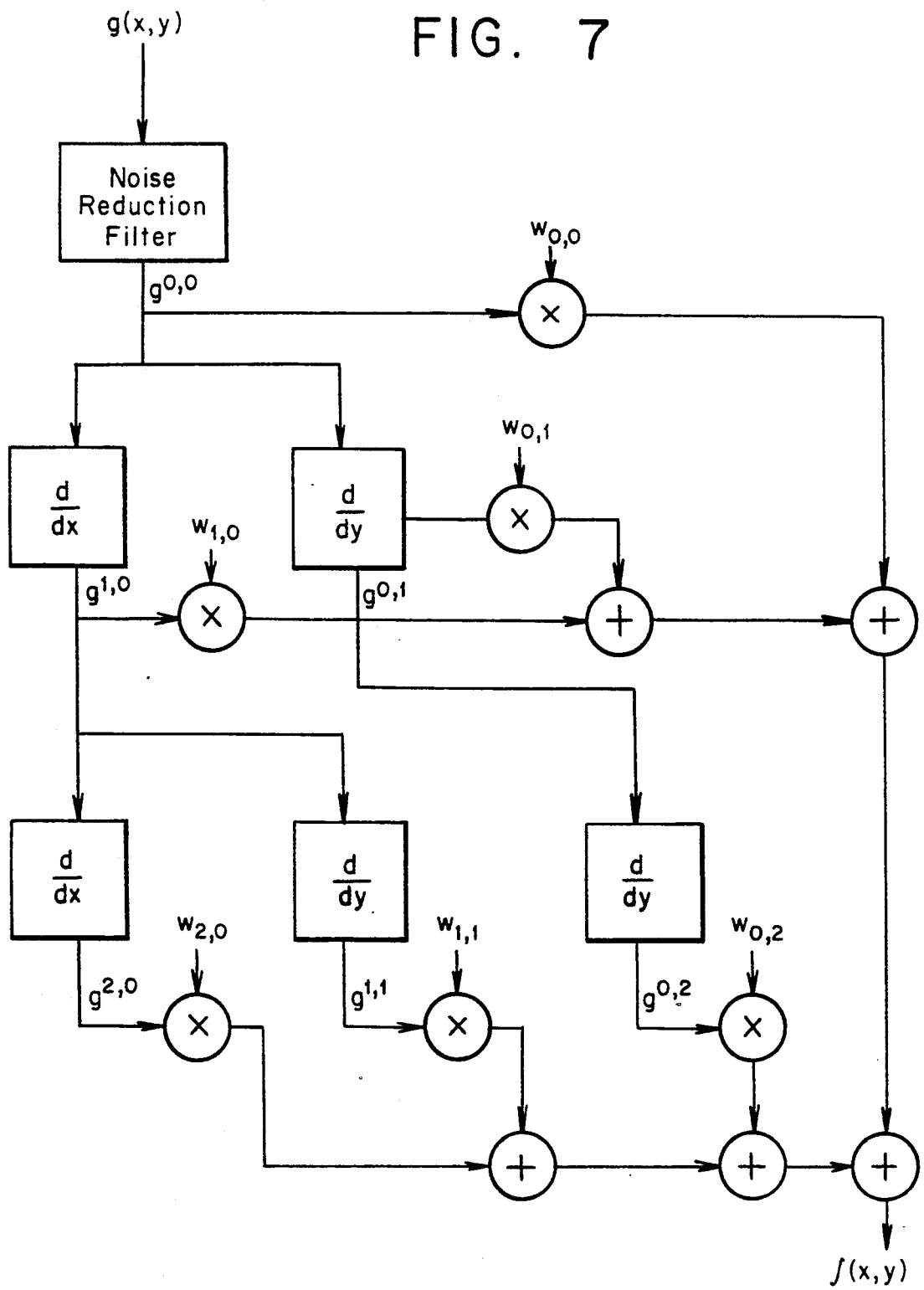
FIG. 7 shows an implementation of a new deconvolution formula to obtain the focused image of an object from its blurred image.

In the method of obtaining the focused image of an object from its blurred image (see FIG. 4a and FIG. 4b), first the distance $r_0$ of the object is determined by employing the method described above. Then this distance information is used to compute the weight parameters $w_{1,i,k-i}$. The image derivatives $$g_{n1}^{i,k-i}$$

of the first normalized image are computed next. The values of the weight parameters $w_{1,i,k-i}$ and the image derivatives $$g_{n1}^{i,k-i}$$

are then substituted into the deconvolution formula given by equation (24) to obtain the focused image of the object. Alternatively, equation (25) can also be used. FIG. 7 illustrates an implementation of equation (24) for deconvolution with $N=2, g(x,y) = g_{n1}(x,y)$, $w_{i,j} = w_{1,i,j}$ and $f(x,y) = f_n(x,y)$.

PARAXIAL GEOMETRIC OPTICS

There are many models for the point spread function of a camera. The method of the present invention is applicable to all models. To illustrate the method of the present invention, a model of the point spread function derived from paraxial geometric optics is considered.

It is known in prior art that according to paraxial geometric optics, the point spread function of a camera has a non-zero constant value equal to $1/A$ inside a region whose area is equal to A and outside this region the value of the point spread function is equal to zero. The shape of the region is the same as the shape of the aperture of the camera, except for a magnification factor. A discussion of the point spread function of a camera based on paraxial geometric optics principles can be found in the technical report: "Determining distance from defocused images of simple objects", TR89.07.20, Computer Vision Laboratory, Department of Electrical Engineering, State University of New York, Stony Brook, NY 11794-2350, 20th Jul. 1989, authored by this same inventor.

Figure 8:
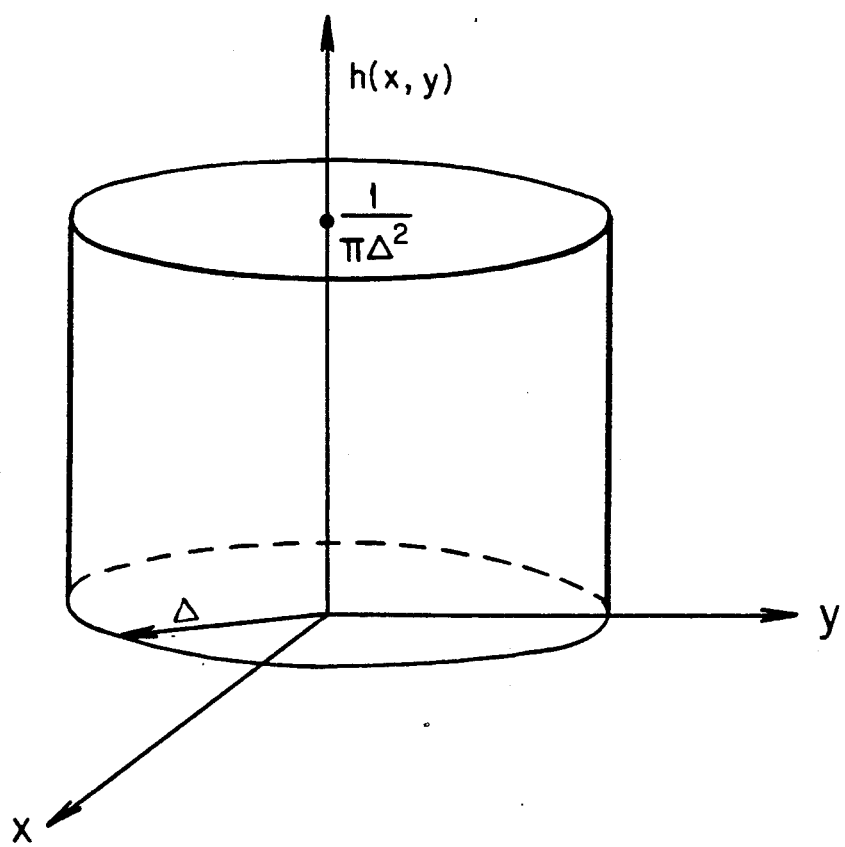
FIG. 8 shows the point spread function (or the impulse response function) of a misfocused camera with a circular aperture.

In the preferred embodiment of the present invention, the shape of the camera aperture is circular. Therefore the point spread function has a non-zero constant value inside a circular region and has a zero value outside of the circular region. FIG. 8 illustrates the point spread function in this case. This circular region is also referred to as "blur circle". The point spread function in this case is circularly symmetric about the center of the blur circle. If the camera is set to the first set of camera parameter values, $e_{a1} = \{\lambda_1, s_1, F_1, D_1\}$ $r_0$ is the distance of the object, then it is known in prior art that the radius of the blur circle $\Delta_1$ can be expressed in reduced units as $$\Delta_1 = \frac{D_1{}^2}{2\lambda_1}\left(\frac{1}{f_1} - \frac{1}{r_0} - \frac{1}{s_1}\right). \tag{32}$$

If $\Delta_1'$ is the radius of the blur circle expressed in absolute units, then the relation between $\Delta_1$ and $\Delta_1'$ is $$\Delta_1 = \frac{\Delta_1'}{\lambda_1(s_1/D_1)}. \tag{33}$$

For example, see technical report: "On the depth information in the point spread function of a defocused optical system", TR 90.02.07, Computer Vision Laboratory, Department of Electrical Engineering, State University of New York, Stony Brook, NY 11794-2350, Feb. 7, 1990, authored by this same inventor.

For this case, the first point spread function $h(x,y;e_{a1}, r_0)$ is given by (see FIG. 8)

$$h(x,y;e_{a1},r_0) = \begin{cases} \dfrac{1}{\pi\Delta_1{}^2} & \text{if } x^2 + y^2 \leq \Delta_1{}^2 \\ 0 & \text{otherwise.} \end{cases} \tag{34}$$

In the above equation, we can substitute for $\Delta_1$ from equation (32) to obtain a more explicit expression for $h(x,y;e_{a1}, r_0)$ directly in terms of the set of camera parameters $e_{a1}$ and the distance $r_0$ of the object.

The (m,n)th moment of the first point spread function $h(x,y;e_{a1}, r_0)$ is denoted by $h_{1,m,n}$ and defined as $$h_{1,m,n} = \int_{-\infty}^{\infty}\int_{-\infty}^{\infty} x^m y^n h(x,y;e_{a1},r_0)dxdy. \tag{35}$$

It can be shown that all odd moments of $h(x,y;e_{a1}, r_0)$ are zero, i.e.

$$h_{1,m,n} = 0 \text{ for } (m \text{ odd}) \text{ or } (n \text{ odd}). \tag{36}$$

In fact it can be easily shown that all odd moments of any circularly symmetric function is zero (a function $h(x,y)$ is circularly symmetric if $h(x,y)$ is a constant when $x^2+y^2$ remains a constant). The even moments of the point spread function $h(x,y;e_{a1}, r_0)$ can be shown to be $$h_{2p,2q} = \begin{cases} 1 & \text{if } (p=0)\wedge(q=0) \\ \dfrac{\Delta^{2q}}{2^{2q-2}} \dfrac{(2q-1)!}{q!(q-1)!(2q+2)} & \text{for } (p=0)\wedge(q \geq 1) \\ \dfrac{\Delta^{2p}}{2^{2p-2}} \dfrac{(2p-1)!}{p!(p-1)!(2p+2)} & \text{for } (p \geq 1)\wedge(q=0) \\ \dfrac{\Delta^{2p+2q}}{2^{2p+2q-3}} \dfrac{(2p-1)!(2q-1)!}{(p+q)!(p-1)!(q-1)!(2p+2q+2)} & \text{for } (p \geq 1)\wedge(q \geq 1). \end{cases} \tag{37}$$

where p and q are integers. Therefore we obtain $$h_{1,0,0} = 1, \tag{38}$$
$$h_{1,0,1} = h_{1,1,0} = h_{1,1,1} = 0,$$

$$h_{1,0,2} = h_{1,2,0} = \frac{\Delta_1{}^2}{4}, \text{ etc.}$$

Similarly, if the camera is set to the second set of camera parameter values $e_{a2} = \{\lambda_2, s_2, F_2, D_2\}$ with the corresponding blur circle radius denoted by $\Delta_2$, then we obtain $$h_{2,0,0} = 1, \tag{39}$$
$$h_{2,0,1} = h_{2,1,0} = h_{2,1,1} = 0,$$

$$h_{2,0,2} = h_{2,2,0} = \frac{\Delta_2{}^2}{4}, \text{ etc.}$$

Substituting the above values into equations (30) we obtain $$w_{1,0,0} = w_{2,0,0} = 1 \tag{40}$$
$$w_{1,0,1} = w_{2,0,1} = w_{1,1,0} = w_{2,1,0} = w_{1,1,1} = w_{2,1,1} = 0$$

$$w_{1,0,2} = w_{1,2,0} = -\frac{\Delta_1{}^2}{8}$$

$$w_{2,0,2} = w_{2,2,0} = -\frac{\Delta_2{}^2}{8}.$$

Substituting the results of equation (40) into equation (24) and equation (25) and setting $N=2$ we obtain $$f_n = g_{n1}^{0,0} - \frac{\Delta_1{}^2}{8}(g_{n1}^{0,2} + g_{n1}^{2,0}) \text{ and} \tag{41}$$

$$f_n = g_{n2}^{0,0} - \frac{\Delta_2{}^2}{8}(g_{n2}^{0,2} + g_{n2}^{2,0}). \tag{42}$$

Using equation (32), the focused image can be directly expressed in terms of the set of camera parameter values $e_{a1}$, $e_{a2}$, and the distance $r_0$ of the object as $$f_n = g_{n1}^{0,0} - \frac{D_1{}^4}{32\lambda_1{}^2}\left(\frac{1}{f_1} - \frac{1}{r_0} - \frac{1}{s_1}\right)^2(g_{n1}^{0,2} + g_{n1}^{2,0}) \text{ and} \tag{43}$$

$$f_n = g_{n2}^{0,0} - \frac{D_2{}^4}{32\lambda_2{}^2}\left(\frac{1}{f_2} - \frac{1}{r_0} - \frac{1}{s_2}\right)^2(g_{n2}^{0,2} + g_{n2}^{2,0}). \tag{44}$$

Equating the right hand sides of equations (43) and (44) we obtain $$g_{n1}^{0,0} - \frac{D_1{}^4}{32\lambda_1{}^2}\left(\frac{1}{f_1} - \frac{1}{r_0} - \frac{1}{s_1}\right)^2(g_{n1}^{0,2} + g_{n1}^{2,0}) =$$

$$g_{n2}^{0,0} - \frac{D_2^4}{32\lambda_2^2}\left(\frac{1}{f_2} - \frac{1}{r_0} - \frac{1}{s_2}\right)^2 (g_{n2}^{0,2} + g_{n2}^{2,0}).$$

The above equation has the same form as that of equation (8). In the above equation, the distance $r_0$ of the object is the only unknown variable. Therefore equation (45) constitutes one equation in one unknown. This equation can be solved to obtain a first set of solutions $r_{s1}$ for the distance $r_0$ of the object.

One method of solving equation (45) is described below. From equation (32), we obtain $$\frac{1}{r_0} = -\left(\frac{2\lambda_1}{D_1^2}\Delta_1 - \frac{1}{f_1} + \frac{1}{s_1}\right). \tag{45}$$

Similarly, for the second camera setting specified by $e_{a2}$ we obtain $$\frac{1}{r_0} = -\left(\frac{2\lambda_2}{D_2^2}\Delta_2 - \frac{1}{f_2} + \frac{1}{s_2}\right). \tag{46}$$

Equating the right hand side of equation (45) to the right hand side of equation (46) and simplifying, we obtain $$\Delta_2 = \alpha\Delta_1 + \beta \tag{47}$$

where $$\alpha = \frac{D_2^2}{D_1^2}\frac{\lambda_1}{\lambda_2} \text{ and } \beta = \frac{D_2^2}{2\lambda_2}\left(\frac{1}{s_1} - \frac{1}{f_1} + \frac{1}{f_2} - \frac{1}{s_2}\right). \tag{48}$$

The values of $\alpha$ and $\beta$ can be calculated immediately from the set of camera parameters $e_{a1}$ and $e_{a2}$. Therefore equation (45) can be written as $$g_{n1}^{0,0} - \frac{\Delta_1^2}{8}(g_{n1}^{2,0} + g_{n1}^{0,2}) = g_{n2}^{0,0} - \frac{(\alpha\Delta_1 + \beta)^2}{8}(g_{n2}^{2,0} + g_{n2}^{0,2}). \tag{49}$$

The above equation is a quadratic equation in $\Delta_1$ which can be written in the form $$a\Delta_1^2 + b\Delta_1 + c = 0 \tag{50}$$

where $$a = \tfrac{1}{8}(\alpha(g_{n2}^{2,0} + g_{n2}^{0,2}) - (g_{n1}^{2,0} + g_{n1}^{0,2})) \tag{51}$$

$$b = \tfrac{1}{4}\alpha\beta(g_{n2}^{2,0} + g_{n2}^{0,2}) \text{ and} \tag{52}$$

$$c = g_{n1}^{0,0} + \tfrac{1}{8}\beta^2(g_{n2}^{2,0} + g_{n2}^{0,2}). \tag{53}$$

If the two solutions for $\Delta_1$ are denoted by $$\Delta_1^+ \text{ and } \Delta_1^-,$$

they can be obtained as $$\Delta_1^+ = \frac{-b + \sqrt{b^2 - 4ac}}{2a} \text{ and } \Delta_1^- = \frac{-b - \sqrt{b^2 - 4ac}}{2a} \tag{54}$$

Corresponding to each solution for $\Delta_1$ one solution can be obtained for distance $r_0$ from equation (45) as $$r_{11} = -\left(\frac{2\lambda_1}{D_1^2}\Delta_1^+ - \frac{1}{f_1} + \frac{1}{s_1}\right)^{-1} \text{ and} \tag{55}$$

$$r_{12} = -\left(\frac{2\lambda_1}{D_1^2}\Delta_1^- - \frac{1}{f_1} + \frac{1}{s_1}\right)^{-1}. \tag{56}$$

The first set of solutions is then given by $$r_{s1} = \{r_{11}, r_{12}\}. \tag{57}$$

To find a unique solution for the distance $r_0$ of the object, a third image $g_3(x,y)$ is used to find a second set of solutions $r_{s1} = \{r_{11}, r_{22}\}$ as described earlier. The element that is common to both $r_{s1}$ and $r_{s2}$ is the actual solution for the distance of the object from the camera.

In the method of autofocusing, first the distance of the object to be focused is determined by using the above method of determining the distance $r_0$. Based on distance $r_0$ and an image focusing formula, a set of camera parameter values $e_{af} = \{\lambda_f, s_f, f_f, D_f\}$ is determined which corresponds to focusing the desired object. An example of the image focusing formula is the well-known lens formula $1/f = 1/u + 1/v$ (see FIG. 2) which relates the focal length of the camera to the position of the object and its focused image. The relation between this image focusing formula and the set of camera parameters $e_{af}$ can be specified by requiring that the radius of the corresponding blur circle be equal to zero. If $\Delta_f$ denotes the radius of the blur circle corresponding to the camera setting specified by $e_{af}$ and $r_0$ is the distance of the object, then $e_{af}$ can be easily determined by setting $\Delta_f = 0$ in the expression for $\Delta_f$ as below:

$$\Delta_f = \frac{D_f^2}{2\lambda_f}\left(\frac{1}{f_f} - \frac{1}{r_0} - \frac{1}{s_f}\right) = 0. \tag{58}$$

In practice the camera parameters $f_f$ and $s_f$ are both free parameters. The value of one of these parameters is first fixed and then equation (58) is solved for the other parameter. The camera is then adjusted so that the camera parameters are equal to the values determined by $e_{af}$. This accomplishes autofocusing.

In the method of obtaining the focused image of an object from its blurred image, first the distance $r_0$ of the object is determined using the method described above. Having determined the distance $r_0$, the focused image of the object is computed using either equation (43) or equation (44). This method of computing the focused image is in fact equivalent to first computing the weight parameters using equations (40), then computing the image derivatives $$g_{n1}^{i,k-i} \text{ (or } g_{n2}^{i,k-i})$$

and substituting the resulting values in the deconvolution formula given by equation (24) (or equation (25)).

GENERALIZATION OF THE METHOD

In the method of determining distance described above, note that the distance $r_0$ is just one of the parameters along with the other camera parameters $s, f, D, \lambda$ on which the point spread function depends. From a mathematical point of view, all these parameters including $r_0$ play the same role in equation (8). There is no specialty associated with any of them. Therefore, a method that is quite similar to the above method can be used to find any other parameters s, f, D, $\lambda$ on which the point spread function depends. For example, to determine the focal length f of the camera system, the distance $r_0$ is taken to be given and equation (8) is solved for f as before.

The above method for determining one unknown parameter can be extended to obtain a method to determine more than one unknown. In this case we need more than two images. In general, if n unknowns are involved then n+1 images are required. For example, if we need to determine two parameters, say $r_0$ and f, then we use three pictures $g_1(x,y)$, $g_2(x,y)$ and $g_3(x,y)$ taken with camera settings $e_{a1}$, $e_{a2}$, and $e_{a3}$ respectively where $$e_{a1} = (s_1, D_1, \lambda_1) \quad (59)$$

$$e_{a2} = (s_2, D_2, \lambda_2) \quad (60)$$

$$e_{a3} = (s_3, D_3, \lambda_3). \quad (61)$$

The following two equations which are similar to equation (8) can be written for the three images:

$$\sum_{k=0}^{N} \sum_{i=0}^{k} w_{1,i,k-i}(h, e_{a1}, f, r_0) g_{n1}^{i,k-i} = \quad (62)$$

$$\sum_{k=0}^{N} \sum_{i=0}^{k} w_{2,i,k-i}(h, e_{a2}, f, r_0) g_{n2}^{i,k-i}$$

$$\sum_{k=0}^{N} \sum_{i=0}^{k} w_{2,i,k-i}(h, e_{a2}, f, r_0) g_{n2}^{i,k-i} = \quad (63)$$

$$\sum_{k=0}^{N} \sum_{i=0}^{k} w_{3,i,k-i}(h, e_{a3}, f, r_0) g_{n3}^{i,k-i}.$$

Equations (62),(63) are solved simultaneously to obtain the two unknowns f, $r_0$. Methods similar to the earlier case can be used to solve the equations.

The two equations above imply that the unknowns $r_0$ and f should remain the same for all the three pictures. However this need not be the case as long as the change in their values are known. For example, let the focal lengths be $f+\delta_1$, $f+\delta_2$, and $f+\delta_3$ for the three images where the change in values $\delta_1$, $\delta_2$, and $\delta_3$ are all known. Then, $$\sum_{k=0}^{N} \sum_{i=0}^{k} w_{1,i,k-i}(h, e_{a1}, f+\delta_1, r_0) g_{n1}^{i,k-i} = \quad (64)$$

$$\sum_{k=0}^{N} \sum_{i=0}^{k} w_{2,i,k-i}(h, e_{a2}, f+\delta_2, r_0) g_{n2}^{i,k-i},$$

$$\sum_{k=0}^{N} \sum_{i=0}^{k} w_{2,i,k-i}(h, e_{a2}, f+\delta_2, r_0) g_{n2}^{i,k-i} = \quad (65)$$

$$\sum_{k=0}^{N} \sum_{i=0}^{k} w_{3,i,k-i}(h, e_{a3}, f+\delta_3, r_0) g_{n3}^{i,k-i}.$$

The two equations above involve only two unknowns (f and $r_0$) and hence can be solved as before. If more than one solution is obtained, then additional images can be used to eliminate spurious solutions and a unique solution can be obtained.

After determining the unknown parameters, the deconvolution formula (24) can be used to obtain the focused image.

A camera is a particular example of a larger class of instruments which can be modeled as linear shift-invariant systems. The method of determining the unknown camera parameters using a set of images taken with different camera parameter values can be generalized to all linear shift-invariant systems. The input signal and the output signals of the linear shift-invariant system can be multi-dimensional signals. A general linear shift-invariant system is characterized by a set of system parameters just as a camera is characterized by a set of camera parameters. A set of output signals of the linear shift-invariant system are obtained for different values of the system parameters. A pair of output signals can be used to formulate one equation similar to equation (8). At least as many such equations as the number of unknown system parameters are formulated for different pairs of output signals. The resulting equations can be solved to determine all the unknown system parameters. Then a deconvolution formula similar to equation (24) can be used to obtain the input signal to the linear shift-invariant system. The relevant deconvolution formula is disclosed by this same inventor in another patent application filed recently: "A Method and Apparatus for Restoring Convolution Degraded Signals", U.S. patent application filed on Jul. 3, 1990.

The general method outlined above could be useful in a wide variety of instruments. A camera system is just one example of an instrument where the application of this method has been presented in complete detail.

CONCLUSION, RAMIFICATIONS, AND SCOPE OF INVENTION

The present invention was mainly conceived in the context of machine vision applications such as robot vision, autonomous vehicle navigation, finding approximate distance of objects as part of a stereo vision system, etc. There are also other applications where this invention can be used after minor modifications. For example it is useful in television microscopy in obtaining improved focus images of three-dimensional specimens. Another application is a completely electronic camera where taking a picture involves storing the image signal directly on a magnetic disk for two or more camera settings, and then processing this image signal on a computer in conjunction with camera characteristics to obtain pictures with desired depth-of-field.

While the description in this report of the method, apparatus, and applications contains many specificities, these should not be construed as limitations on the scope of the invention, but rather as exemplifications of preferred embodiments thereof. Further modifications and extensions of the present invention herein disclosed will occur to persons skilled in the art to which the present invention pertains, and all such modifications are deemed to be within the scope and spirit of the present invention as defined by the appended claims and their legal equivalents thereof.

ACKNOWLEDGEMENTS

The help of Nalini Agarwal and Sanjay Sethi in preparing this application is gratefully acknowledged. This work was made possible by the cooperation of my wife.

I claim:

1. A method of determining the distance of an object from a camera system wherein no Fourier transforms are computed, said camera system having an aperture through which light enters, an image detector, an image forming optical system having a first and a second principal plane and a focal length, said second principal plane being arranged closer to said image detector than said first principal plane, a light filter, a camera controller, and an image processor being operatively connected to said image detector and to said camera controller, said method comprising:

a) setting said camera system to a first set of camera parameters including at least one of:
  i) distance(s) between said second principal plane and said image detector,
  ii) diameter (D) of said camera aperture,
  iii) focal length (f) of said camera system, and
  iv) spectral light transmission characteristic ($\lambda$) of said light filter;
b) forming a first image of said object with said image forming optical system;
c) recording said first image in said image detector as a first digital image;
d) setting said camera system to a second set of camera parameters including at least one of:
  i) distance(s) between said second principal plane and said image detector,
  ii) diameter (D) of said camera aperture,
  iii) focal length (f) of said camera system, and
  iv) spectral light transmission characteristic ($\lambda$) of said light filter;
e) forming a second image of said object with said image forming optical system;
f) recording said second image in said image detector as a second digital image;
g) supplying said first digital image to an image normalization means, said image normalization means preprocessing said first digital image to provide a first normalized image, said first normalized image being related to a first point spread function of said camera system by a convolution operation;
h) supplying said second digital image to said image normalization means, said image normalization means preprocessing said second digital image to provide a second normalized image, said second normalized image being related to a second point spread function of said camera system by a convolution operation;
i) providing said first normalized image to a set of differentiators, said set of differentiators providing as output a first set of image derivative values;
j) providing said second normalized image to said set of differentiators, said set of differentiators providing as output a second set of image derivative values;
k) transmitting said first set of camera parameters, said second set of camera parameters, said first set of image derivative values and said second set of image derivative values to an equation solving means, said equation solving means being capable of solving a first mathematical relationship to obtain a first set of solutions, said first mathematical relationship including a first expression for a focused image in terms of said first set of camera parameters and said first set of image derivative values, said first mathematical relationship including a second expression for a focused image in terms of said second set of camera parameters and said second set of image derivatives, said first set of solutions for said first mathematical relationship representing the distance of said object from said camera system;

l) setting said camera system to a third set of camera parameters including at least one of:
  i) distance (s) between said second principal plane and said image detector,
  ii) diameter (D) of said camera aperture,
  iii) focal length (f) of said camera system, and
  iv) spectral light transmission characteristic ($\lambda$) of said light filter;
m) forming a third image of said object with said image forming optical system;
n) recording said third image in said image detector as a third digital image;
o) supplying said third digital image to said image normalization means, said image normalization means preprocessing said third digital image to provide a third normalized image, said third normalized image being related to a third point spread function of said camera system by a convolution operation;
p) providing said third normalized image to said set of differentiators, said set of differentiators providing as output a third set of image derivative values;
q) transmitting said second set of camera parameters, said third set of camera parameters, said second set of image derivative values and said third set of image derivative values to said equation solving means, said equation solving means being capable of solving a second mathematical relationship to obtain a second set of solutions, said second mathematical relationship including said second expression for a focused image in terms of said second set of camera parameters and said second set of image derivatives, said second mathematical relationship including a third expression for a focused image in terms of said third set of camera parameters and said third set of image derivatives, said second set of solutions for said mathematical relationship representing the distance of said object from said camera system;
r) providing said first set of solutions and said second set of solutions to a set intersection means, said set intersection means being capable of comparing said first set of solutions and said second set of solutions to determine a common value representing said distance of said object from said camera system.

2. The method of claim 1 wherein the preprocessing operation performed by said image normalization means includes at least one of:
  (a) correcting for a sensor response characteristic of said image detector;
  (b) correcting for a non-uniform light transmission of said optical system;
  (c) magnification normalization of said first image and said second image;
  (d) brightness normalization of said first image and said second image; and
  (e) noise filtering to reduce the effects of noise.

3. The method of claim 1 wherein said first and second expression for a focused image is the result of multiplying each member of said first and second set of image derivatives by a weight parameter to obtain a first and second set of weighted image derivatives and summing corresponding members of said first and second set of weighted image derivatives.

4. The method of claim 3 wherein each said weight parameter depends on a first and a second set of moment parameters which correspondingly characterize said first and said second point spread function.

5. The method of claim 4 wherein said first point spread function is symmetric and therefore odd moment parameters in said first set of moment parameters are all zero.

6. The method of claim 1 wherein said first point spread function has a non-zero constant value inside a region having the same shape as that of said aperture except for a magnification factor and has a zero value outside of said region.

7. The method of claim 1 wherein said aperture has a circular shape and therefore said first point spread function has a non-zero constant value inside a circular region and has a zero value outside of said circular region.

8. A method of autofocusing a camera system to an object wherein no Fourier transforms are computed, said camera system having an aperture through which light enters, an image detector, an image forming optical system having a first and second principal plane and a focal length, said second principal plane being arranged closer to said image detector than said first principal plane, a light filter, a camera controller, and an image processor being operatively connected to said image detector and to said camera controller, said method comprising:
   a) setting said camera system to a first set of camera parameters including at least one of:
      i) distance(s) between said second principal plane and said image detector,
      ii) diameter (D) of said camera aperture,
      iii) focal length (f) of said camera system, and
      iv) spectral light transmission characteristic ($\lambda$) of said light filter;
   b) forming a first image of said object with said image forming optical system;
   c) recording said first image in said image detector as a first digital image;
   d) setting said camera system to a second set of camera parameters including at least one of:
      i) distance (s) between said second principal plane and said image detector,
      ii) diameter (D) of said camera aperture,
      iii) focal length (f) of said camera system, and
      iv) spectral light transmission characteristic ($\lambda$) of said light filter;
   e) forming a second image of said object with said image forming optical system;
   f) recording said second image in said image detector as a second digital image;
   g) supplying said first digital image to an image normalization means, said image normalization means preprocessing said first digital image to provide a first normalized image, said first normalized image being related to a first point spread function of said camera system by a convolution operation;
   h) supplying said second digital image to said image normalization means, said image normalization means preprocessing said second digital image to provide a second normalized image, said second normalized image being related to a second point spread function of said camera system by a convolution operation;
   i) providing said first normalized image to a set of differentiators, said set of differentiators providing as output a first set of image derivative values;
   j) providing said second normalized image to said set of differentiators, said set of differentiators providing as output a second set of image derivative values;
   k) transmitting said first set of camera parameters, said second set of camera parameters, said first set of image derivative values and said second set of image derivative values to an equation solving means, said equation solving means being capable of solving a first mathematical relationship to obtain a first set of solutions, said first mathematical relationship including a first expression for a focused image in terms of said first set of camera parameters and said first set of image derivative values, said first mathematical relationship including a second expression for a focused image in terms of said second set of camera parameters and said second set of image derivatives, said first set of solutions for said first mathematical relationship representing the distance of said object from said camera system;
   l) setting said camera system to a third set of camera parameters including at least one of:
      i) distance (s) between said second principal plane and said image detector,
      ii) diameter (D) of said camera aperture,
      iii) focal length (f) of said camera system, and
      iv) spectral light transmission characteristic ($\lambda$) of said light filter;
   m) forming a third image of said object with said image forming optical system;
   n) recording said third image in said image detector as a third digital image;
   o) supplying said third digital image to said image normalization means, said image normalization means preprocessing said third digital image to provide a third normalized image, said third normalized image being related to a third point spread function of said camera system by a convolution operation;
   p) providing said third normalized image to said set of differentiators, said set of differentiators providing as output a third set of image derivative values;
   q) transmitting said second set of camera parameters, said third set of camera parameters, said second set of image derivative values and said third set of image derivative values to said equation solving means, said equation solving means being capable of solving a second mathematical relationship to obtain a second set of solutions, said second mathematical relationship including said second expression for a focused image in terms of said second set of camera parameters and said second set of image derivatives, said second mathematical relationship including a third expression for a focused image in terms of said third set of camera parameters and said third set of image derivatives, said second set of solutions for said mathematical relationship representing the distance of said object from said camera system;
   r) providing said first set of solutions and said second set of solutions to a set intersection means, said set intersection means being capable of comparing said first set of solutions and said second set of solutions to determine a common value representing said distance of said object from said camera system.
   s) computing a new set of camera parameter values for focusing said object based on the distance of said object from said camera system and setting said camera system to said new set of camera parameter values whereby said camera system is autofocused to said object.

9. The method of claim 8 wherein the preprocessing operation performed by said image normalization means includes at least one of:
   (a) correcting for a sensor response characteristic of said image detector;
   (b) correcting for a non-uniform light transmission of said optical system;
   (c) magnification normalization of said first image and said second image;
   (d) brightness normalization of said first image and said second image; and
   (e) noise filtering to reduce the effects of noise.

10. The method of claim 8 wherein said first expression for a focused image is obtained by multiplying each member of said first set of image derivatives by a weight parameter to obtain a first set of weighted image derivatives and wherein all members of said first set of weighted image derivatives are added.

11. The method of claim 8 wherein said second expression for a focus image is obtained by multiplying each member of said second set of image derivatives by a weight parameter to obtain a second set of weighted image derivatives and wherein all members of said second set of weighted image derivatives are added.

12. The method of claim 10 wherein each said weight parameter depends on a first set of moment parameters which correspondingly characterize said first point spread function.

13. The method of claim 11 wherein each said weight parameter depends on a second set of moment parameters which correspondingly characterize said second point spread function.

14. The method of claim 12 wherein said first point spread function is symmetric and odd moment parameters in said first set of moment parameters are all zero.

15. The method of claim 8 wherein said first point spread function has a non-zero constant value inside a region having the same shape as that of said aperture except for a magnification factor and has a zero value outside of said region.

16. The method of claim 8 wherein said aperture has a circular shape and therefore said first point spread function has a non-zero constant value inside a circular region and has a zero value outside of said circular region.

17. A method of obtaining a focused image of an object from a blurred image of said object, wherein no Fourier transforms are computed, said blurred image formed in a camera system, said camera system having an aperture through which light enters, an image detector, an image forming optical system having a first and a second principal plane and a focal length, said second principal plane being arranged closer to said image detector than said first principal plane, a light filter, a camera controller, and an image processor being operatively connected to said image detector and to said camera controller, said method comprising:
   a) setting said camera system to a first set of camera parameters including at least one of:
      i) distance(s) between said second principal plane and said image detector,
      ii) diameter (D) of said camera aperture,
      iii) focal length ($f$) of said camera system, and
      iv) spectral light transmission characteristic ($\lambda$) of said light filter;
   b) forming a first image of said object with said image forming optical system;
   c) recording said first image in said image detector as a first digital image;
   d) setting said camera system to a second set of camera parameters including at least one of:
      i) distance (s) between said second principal plane and said image detector,
      ii) diameter (D) of said camera aperture,
      iii) focal length ($f$) of said camera system, and
      iv) spectral light transmission characteristic ($\lambda$) of said light filter;
   e) forming a second image of said object with said image forming optical system;
   f) recording said second image in said image detector as a second digital image;
   g) supplying said first digital image to an image normalization means, said image normalization means preprocessing said first digital image to provide a first normalized image, said first normalized image being related to a first point spread function of said camera system by a convolution operation;
   h) supplying said second digital image to said image normalization means, said image normalization means preprocessing said second digital image to provide a second normalized image, said second normalized image being related to a second point spread function of said camera system by a convolution operation;
   i) providing said first normalized image to a set of differentiators, said set of differentiators providing as output a first set of image derivative values;
   j) providing said second normalized image to said set of differentiators, said set of differentiators providing as output a second set of image derivative values;
   k) transmitting said first set of camera parameters, said second set of camera parameters, said first set of image derivative values and said second set of image derivative values to an equation solving means, said equation solving means being capable of solving a first mathematical relationship to obtain a first set of solutions, said first mathematical relationship including a first expression for said focused image in terms of said first set of camera parameters and said first set of image derivative values, said first mathematical relationship including a second expression for said focused image in terms of said second set of camera parameters and said second set of image derivatives, said first set of solutions for said first mathematical relationship representing the distance of said object from said camera system;
   l) setting said camera system to a third set of camera parameters including at least one of:
      i) distance (s) between said second principal plane and said image detector,
      ii) diameter (D) of said camera aperture,
      iii) focal length ($f$) of said camera system, and
      iv) spectral light transmission characteristic ($\lambda$) of said light filter;
   m) forming a third image of said object with said image forming optical system;
   n) recording said third image in said image detector as a third digital image;

o) supplying said third digital image to said image normalization means, said image normalization means preprocessing said third digital image to provide a third normalized image, said third normalized image being related to a third point spread function of said camera system by a convolution operation;

p) providing said third normalized image to said set of differentiators, said set of differentiators providing as output a third set of image derivative values;

q) transmitting said second set of camera parameters, said third set of camera parameters, said second set of image derivative values and said third set of image derivative values to said equation solving means, said equation solving means being capable of solving a second mathematical relationship to obtain a second set of solutions, said second mathematical relationship including said second expression for a focused image in terms of said second set of camera parameters and said second set of image derivatives, said second mathematical relationship including a third expression for a focused image in terms of said third set of camera parameters and said third set of image derivatives, said second set of solutions for said mathematical relationship representing the distance of said object from said camera system;

r) providing said first set of solutions and said second set of solutions to a set intersection means, said set intersection means being capable of comparing said first set of solutions and said second set of solutions to determine a common value representing said distance of said object from said camera system;

s) substituting the values of said first set of camera parameter values, said first set of image derivatives, and the distance of said object from said camera system into said first expression to obtain said focused image of said object.

18. Apparatus for determining the distance of an object from a camera system, said apparatus comprising a camera system characterized by a set of camera parameters, a camera controller for setting said set of camera parameters to desired values, an image forming optical system for forming images of said object, an image detector for recording images of said object, an image normalization means for normalizing images of said object, a derivative computation means for computing derivatives of normalized images, an equation solving means capable of solving a plurality of mathematical relationships having values of different derivatives of normalized images and camera parameter values, and a set intersection means for comparing at least two sets of solutions provided by said equation solving means and determining a common value representing the distance of said object from said camera system.

19. The apparatus of claim 18 which further includes a focus parameter determination means for determining a value for said set of camera parameters based on the distance of said object from said camera so that said object is focused by setting said set of camera parameters to the value determined by said focus parameter determination means.

20. The apparatus of claim 18 which further includes a focused image determination means which takes as input a set of derivatives of a blurred image of said object, values of said set of camera parameters, distance of said object from said camera and uses a deconvolution formula to give as output the focused image of said object without computing any Fourier transforms.

* * * * *